Jan. 6, 1959 W. GLOVER 2,867,125
FRICTION MATERIAL
Filed June 24, 1955
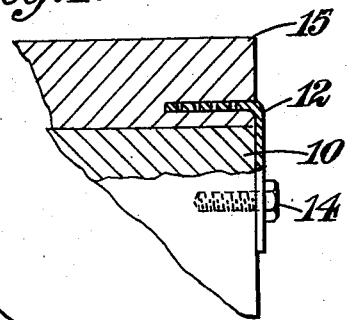
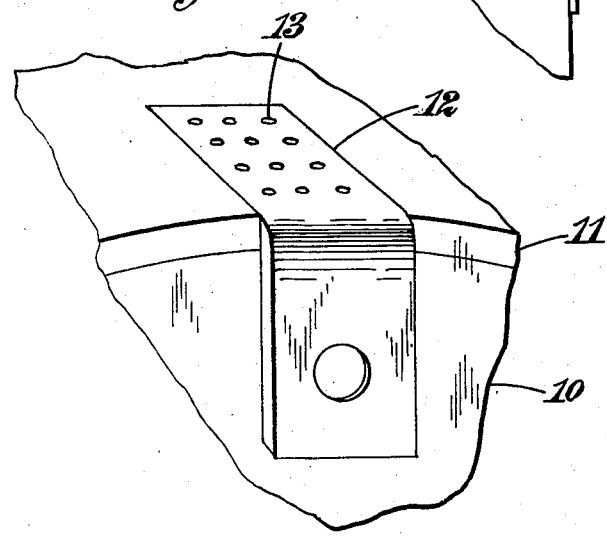
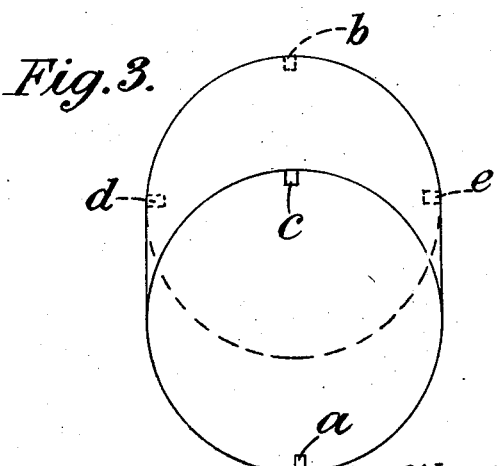
INVENTOR
WILFRID GLOVER
BY
John O. Haney
ATTY.

United States Patent Office 2,867,125
Patented Jan. 6, 1959

2,867,125

FRICTION MATERIAL

Wilfrid Glover, Leyland, England, assignor to British Tyre & Rubber Company Limited, London, England, a British company Application June 24, 1955, Serial No. 517,884

Claims priority, application Great Britain June 25, 1954

1 Claim. (Cl. 74—230.7)

The invention relates to friction materials and is especially concerned with such materials which may be applied as coverings for pulleys to increase the grip of belts thereon.

The invention provides a friction material comprising a synthetic elastomer, a plasticiser therefor, electrically conducting carbon black in amount to impart sufficient electrical conductivity to reduce electrostatic charges, and a grit imparting non-slip characteristic.

The material may be built up on a pulley as a covering therefor, or be made up into segments and secured as such to a pulley or it may be applied (e. g. by frictioning) to a fabric (e. g. nylon tape) and the fabric secured to a pulley, e. g. by adhesive.

On account of its fire-resisting properties the preferred elastomer is neoprene or like chloroprene base material. Alternatively poly-vinyl chloride or a co-polymer of vinyl chloride and vinylidene chloride may be used with or without a proportion of a co-polymer of butadiene-acrylonitrile admixed therewith to improve the calendering properties.

The grit may be finely divided quartz, slate flour or silica.

The plasticiser used is preferably wholly or mainly of the non-inflammable phosphate type such as tritolyl phosphate. Such plasticisers may be used in combination with minor proportions of other plasticisers such as dibutyl sebacate and di-octyl adipate which impart better low temperature flexibility.

The proportions in which the several constituents are used may be with the following ranges:

| | Percent |
|---|---|
| Neoprene | 30–60 |
| Grit | 5–30 |
| Carbon black | 10–30 |
| Plasticiser | 5–30 |

Remainder, up to 100% usual rubber compounding ingredients such as fillers, processing aids, anti-ageing and vulcanising materials.

In the above, the neoprene may be replaced by poly-vinyl chloride or by the above-mentioned co-polymer.

The plasticiser may be wholly of the phosphate type or between 5 and 10% may be one of the other plasticisers referred to above.

A specific example of the invention as applied to a covering for a metal pulley will now be described with reference to the accompanying drawings in which:

Figure 1 is a view, partly in section, of a portion of the pulley,

Figure 2 is a perspective view of the pulley in course of construction, and

Figure 3 is a diagram illustrating the pulley.

The material used for coating the pulley was calendered into sheet form from the following composition:

| | |
|---|---|
| Neoprene GN | 45.00 |
| Zinc oxide | 1.50 |
| Light calcined magnesia | 1.50 |
| Agerite powder | .50 |
| Tri-tolyl phosphate | 4.50 |
| Di butyl phthalate | 2.50 |
| Stearic acid | 1.00 |
| Acetylene black | 22.00 |
| Quartz flour 150s mesh | 8.00 |
| M. P. C. gas black | 4.00 |
| China clay | 9.50 |
| | 100.00 |

To cover the pulley, the circumferential surface of the pulley was first roughened by shot-blasting. Two coats of a suitable bonding adhesive were then applied to the roughened surface. The sheet material was cut to the width of the pulley and two plies of the material were built up around the pulley. Figure 2 shows a portion of the pulley at 10 and the two plies of the material at 11. Brass angle strips 12 were then rolled into the covering, the strips having perforations 13 which were filled by the covering material. The strips were held by screws 14 which, at this stage, were left loose. Additional plies of the material were applied to build up the covering over the strips as shown at 15 in Figure 1. The coating was next cured by heating. Finally the screws 14 were tightened and the surface of the coating finished by grinding the circumference and trimming the ends.

The adhesive used to bond the coating to the metal is non-conducting and the purpose of the brass strips is to ensure an electrical connection between the covering and the body of the pulley. For pulleys up to about 20 inches in diameter two strips located at *a* and *b* have been found sufficient. For larger pulleys four strips located at *a*, *c*, *d* and *e* are employed.

The covering employed in the above example had a Shore hardness of 70°+5°.

Another specific example of the material according to the invention has as its basic constituents:

| | Percent |
|---|---|
| Neoprene | 35 |
| Acetylene black | 20.0 |
| Quartz flour 150 mesh | 6.25 |
| Plasticiser | 15 |

The material also includes, as the remainder of 100% processing aids, fillers, anti-ageing and vulcanising materials. The material has a Shore hardness of 55°.

It is an advantage of the material according to the invention that when applied to a pulley it affords an effective grip on the belt and also provides means for dissipating electrostatic charges from the belt, especially when the latter is, itself, electrically conducting.

I claim:

A rigid metal pulley having on its circumferential surface a layer of an electrically conductive resilient fire-resistant friction pulley-lagging material comprising 30 to 60% of an elastomer selected from the class consisting of polychloroprene, polyvinyl chloride, copolymers of vinyl chloride and vinylidene chloride, mixtures of copolymers of butadiene and acrylonitrile with polyvinyl chloride, mixtures of copolymers of vinyl chloride and vinylidene chloride with copolymers of butadiene and acrylonitrile; 5 to 30% of a grit selected from the class consisting of finely divided quartz, finely divided slate flour, and finely divided silica; and 10 to 30% of an electrically conducting carbon black; and 5 to 30% of a plasticizer comprising a major proportion of a phosphoric acid ester; said layer being adhesively bonded to said pulley surface; and a plurality of perforated metal electrically conductive strips embedded in said layer against displacement therein at the circumferential margins of said layer, said strips having portions projecting from said layer and embracing the radial sides of the pulley, and means for fastening said projecting portions rigidly in electrically conducting relation to the radial sides of the pulley.

References Cited in the file of this patent

UNITED STATES PATENTS

| | | |
|---|---|---|
| 1,645,552 | Tannewitz | Oct. 18, 1927 |
| 1,983,267 | Browne | Dec. 4, 1934 |
| 2,011,496 | Luchinger | Aug. 13, 1935 |
| 2,205,438 | Richter | June 25, 1940 |
| 2,267,503 | Lytle | Dec. 23, 1941 |
| 2,324,589 | Lytle | July 20, 1943 |
| 2,373,876 | Cutler | Apr. 17, 1945 |
| 2,428,298 | Spokes et al. | Sept. 30, 1947 |
| 2,443,109 | Linder | June 8, 1948 |
| 2,517,014 | Miller et al. | Aug. 1, 1950 |
| 2,526,059 | Zabel | Oct. 17, 1950 |

OTHER REFERENCES

Rubber Chemistry and Technology, volume 15, 1942, pages 146–157.